United States Patent [19]

Sundberg et al.

[11] Patent Number: 4,678,911

[45] Date of Patent: Jul. 7, 1987

[54] METHOD OF COLLECTING AND PROCESSING SPECTRAL DATA FOR THE EARTH'S SURFACE

[75] Inventors: Kenneth R. Sundberg; Keith H. Patton, both of Bartlesville, Okla.

[73] Assignee: Phillips Petroleum, Bartlesville, Okla.

[21] Appl. No.: 690,424

[22] Filed: Jan. 10, 1985

[51] Int. Cl.$^4$ .............................................. G01V 5/00
[52] U.S. Cl. ..................................... 250/253; 364/420
[58] Field of Search ................ 250/253; 364/420, 422, 364/498

[56] References Cited

U.S. PATENT DOCUMENTS

| | | | |
|---|---|---|---|
| 2,742,575 | 4/1956 | Bray | 250/253 |
| 3,278,746 | 10/1966 | Fiat | 250/253 |
| 4,310,758 | 1/1982 | Peterson | 250/255 |
| 4,421,981 | 12/1983 | Hough | 250/253 |
| 4,449,047 | 5/1984 | Monroe | 250/253 |

OTHER PUBLICATIONS

Chang et al., Horler et al., Lefeure and Lyon "Official Program", Sixth Annual Pecora Symposium and Exposition, Apr. 1980.

*Primary Examiner*—Janice A. Howell
*Attorney, Agent, or Firm*—William R. Sharp

[57] ABSTRACT

A method of collecting and processing spectral data obtained from the earth's surface is employed to identify areas where hydrocarbon seepage to the surface is occurring. Intensity or brightness is detected from bands 4 and 5 of light reflected from a plurality of pixels, each pixel being a small subsection of a large sectional area of the earth's terrain. Band 4 and band 5 intensity values are accordingly obtained for each pixel. An alteration index, or $H(x)$, value is then calculated for each pixel wherein $$H(x) = K[F_4(x) - F_5(x)],$$

where K is a constant, x is a variable representing intensity, and $F_4(x)$ and $F_5(x)$ are functions of intensity for each respective band. Pixels can be selected for potential drilling if they have corresponding H values above a predetermined H value.

8 Claims, 9 Drawing Figures

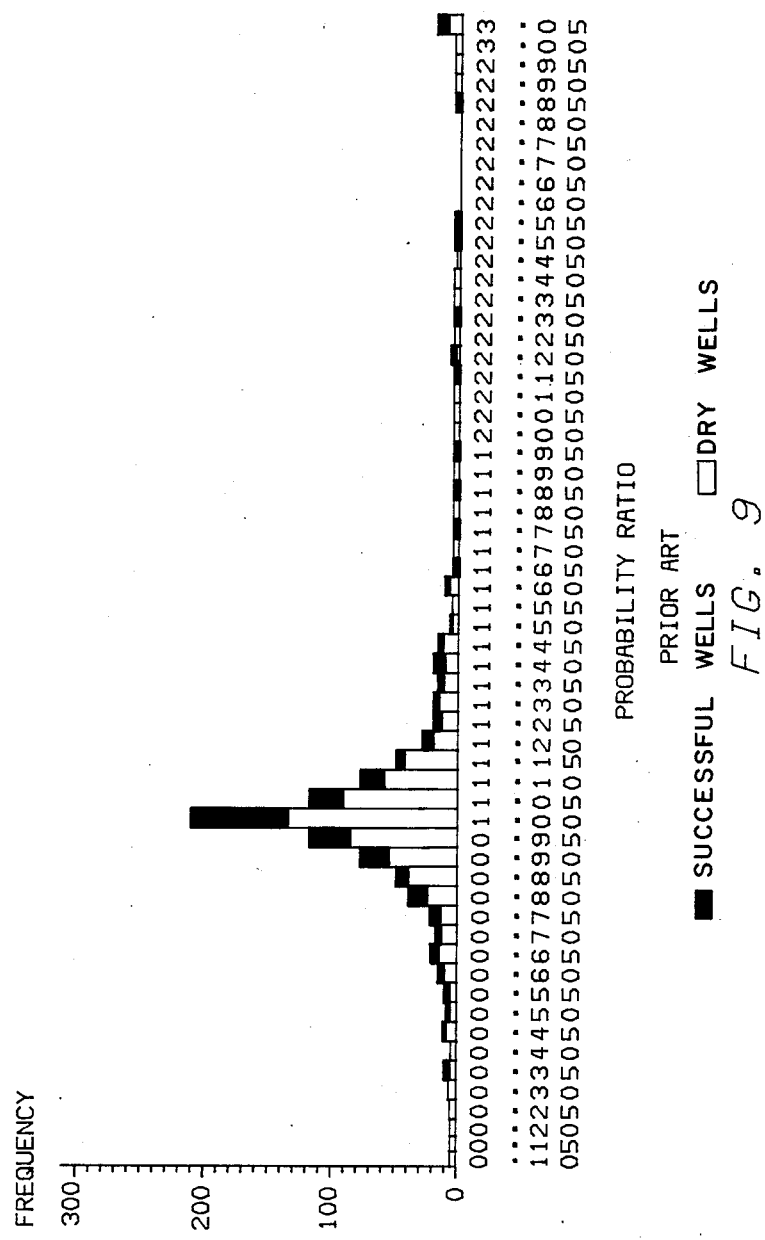

METHOD OF COLLECTING AND PROCESSING SPECTRAL DATA FOR THE EARTH'S SURFACE

BACKGROUND OF THE INVENTION

This invention relates to a method of collecting and processing spectral data obtained from the detection of electromagnetic radiation reflected from the earth's surface.

The invention is particularly suitable for indicating areas in which hydrocarbon seepage from buried oil or gas reservoirs is occurring. Such seepage causes visible changes in the reflectance spectra of the earth's surface. One prior method utilizes LANDSAT satellite spectral data to assist in identifying areas of hydrocarbon seepage, wherein a section of the earth's surface is first selected, the section being divided into a plurality of subsections or pixels. A brightness or intensity value is obtained in LANDSAT band 4 (500 nm–600 nm wavelength range) for electromagnetic radiation reflected from each pixel, and a similar procedure is carried out for each pixel in respect to LANDSAT band 5 (600 nm–700 nm wavelength range). A cumulative probability density function value is then calculated for each pixel's corresponding band 4 and 5 brightness values. The two cumulative probability density function values obtained for each pixel are then utilized to obtain a ratio. This ratio is most conveniently derived by dividing the cumulative probability density for band 5 into the cumulative probability density for band 4. Pixels are identified as having hydrocarbon seepage if those pixels have associated ratios above a predetermined value. Although this method serves to predict areas of hydrocarbon seepage somewhat effectively, it would be desirable to improve on the results obtained by this method.

SUMMARY OF THE INVENTION

It is, therefore, an object of the present invention to provide an improved method of processing surface spectral data to locate areas of hydrocarbon seepage.

It is also an object of the invention to provide such a method of processing spectral data which is highly accurate in identifying areas of hydrocarbon seepage, and therefore areas in which oil or gas reservoirs are located.

The above objects are realized in a method of collecting and processing spectral data for a section of the earth's surface, wherein the section is divided into a plurality of subsections called pixels. The intensity of electromagnetic radiation reflected from the earth's surface corresponding to each pixel is detected for a first wave length range and a second wave length range. The first wave length range lies within one waveband (called band 4) from about 500 nm to about 600 nm, whereas the second wave length range lies within another waveband (called band 5) from 600 nm to about 700 nm. Thus, a band 4 intensity value and a band 5 intensity value is obtained for each pixel in the section. The value of a function $F_4(x)$ corresponding to a band 4 intensity value is computed. The function $F_4(x)$ is a generally monotonic function of intensity, wherein intensity is represented by the variable x. For at least one range of band 4 intensity values, which includes the mean band 4 intensity value, $F_4(x)$ either increases or decreases in value as the band 4 intensity increases in value. The value of a function $F_5(x)$ is calculated similarly for each pixel. $F_5(x)$ is also monotonic, and wherein for at least one range of band 5 intensity values, which includes the mean band 5 intensity value, $F_5(x)$ changes in value in the same direction as $F_4(x)$. Therefore, an $F_4(x)$ value and $F_5(x)$ value is derived for each pixel. The value of an alteration index $H(x)$ is computed for each pixel utilizing the calculated $F_4(x)$ and $F_5(x)$ values, where $$H(x) = K[F_4(x) - F_5(x)]$$

and where K is a constant. After calculation of H for each pixel, these H values can be utilized in selecting pixels which have likely hydrocarbon seepage. The pixels are so selected if they have a corresponding H value above a predetermined value, if each of the above mentioned functions increases as intensity increases. Pixels are selected as having hydrocarbon seepage if their associated H values are below a predetermined value if each of the functions $F_4(x)$ and $F_5(x)$ decrease as intensity increases.

According to a preferred embodiment, $F_4(x)$ and $F_5(x)$ are cumulative probability density functions.

BRIEF DESCRIPTION OF THE DRAWINGS

FIG. 9 is a graph similar to FIG. 8 which shows such a comparison of successful and unsuccessful wells as applied to the above discussed prior method.

DESCRIPTION OF THE PREFERRED EMBODIMENTS

A preferred embodiment of the method of the present invention will now be described in reference to the FIGURES.

Figure 1:
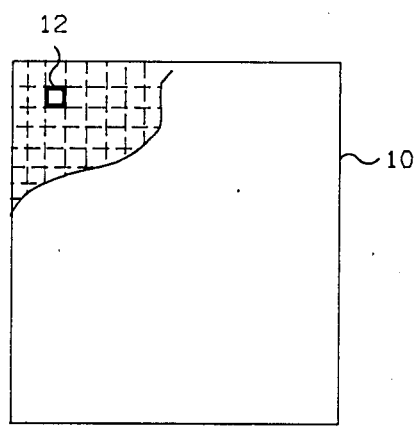
FIG. 1 is a schematic representation of a section of the earth's surface, wherein a portion of the section is shown as being divided into pixels.

Referring now to FIG. 1, a section of the earth's surface, schematically shown at 10, is first selected for gathering and processing data with respect thereto. This section is divided for the purpose of spectral data collection into a plurality of subsections or pixels, one of which is boldly outlined and shown at 12. The section can contain from, for example, about 500 to about 100,000 pixels (only a portion of which are shown in FIG. 1, and not to scale), more preferably from about 30,000 to 50,000, and most preferably about 30,000 pixels. Each pixel is typically about an acre in area. Most conveniently, spectral data for each pixel is collected by means of one of the LANDSAT satellites, such as LANDSAT 1, 2, 3, or 4. Each of these LANDSAT satellites has a multispectral scanner aboard which detects electromagnetic radiation reflected from the surface of the earth. The scanner has the capability of detecting radiation in several wavebands, including band 4 (500 nm-600 nm or green) and band 5 (600 nm-700 nm or red). In operation, the scanner aboard LANDSAT scans the earth's surface so as to receive radiation being reflected from each of the separate pixels. For each pixel, the scanner produces an electrical signal proportional to the energy reflected from the pixel for each of bands 4 and 5. These signals are then transmitted in digital form to a ground station for recording. The signal produced and transmitted as described is generally proportional to the intensity of radiation received by the multispectral scanner for each pixel. However, the recorded signal is divided into 64 unitless increments, such that a signal for a particular pixel is assigned a digit from 0 to 64. The parameter thus detected and measured by the LANDSAT scanner is usually called "brightness", which is a nonphysical parameter, but is generally proportionally related to intensity. Therefore, throughout this description, the terms brightness and intensity will be regarded as virtually synonymous. Hereinafter, the term brightness will be used since the particularly preferred embodiment herein described is in terms of the LANDSAT satellite. It should be understood, however, that the physical parameter being detected by the scanner is actually intensity of radiation, as modified by the earth's atmosphere, reflected from each pixel.

LANDSAT data can be obtained in digital or image form and can be purchased from the Department of Interior's EROS Data Center, Sioux Falls, S. Dak. If data is purchased in image form, a photographic representation of the terrain is supplied which is typically converted to digital form for processing. Most conveniently for the purposes of this invention however, data is obtained in digital form on computer-compatible tapes. The tapes contain, therefore, a brightness digital value for each pixel in band 4, and a brightness value for each pixel in band 5 (among other bands such as 6 and 7 not as applicable to the present invention as will be explained in more detail below). Typically, as purchased, a LANDSAT tape will contain data for what is called a "scene". Such a scene is a relatively large area of the earth's terrain which includes about 7 million pixels, each pixel being about an acre in area. As noted above, it is preferable according to the present invention to utilize an area containing less than about 100,000 pixels. Applications to these smaller areas assures that the imagery within a section is comparable. Thus, a portion or section of the terrain is usually selected from the scene whose associated data is processed according to the present method.

Thus, a band 4 brightness (or intensity) value is obtained for each pixel in the selected section for band 4, and a band 5 brightness value is obtained for each pixel for band 5. It should be understood that although brightness values for all of bands 4 and 5 are obtained in the preferred embodiment, smaller wavelength ranges within these bands could be employed for brightness value data collection. Additionally, although the preferred embodiment is described as employing LANDSAT data, the above data could alternatively be collected by means of a multispectral scanner aboard an aircraft similar to that described in U.S. Pat. No. 4,421,981 of Hough.

Figure 2:
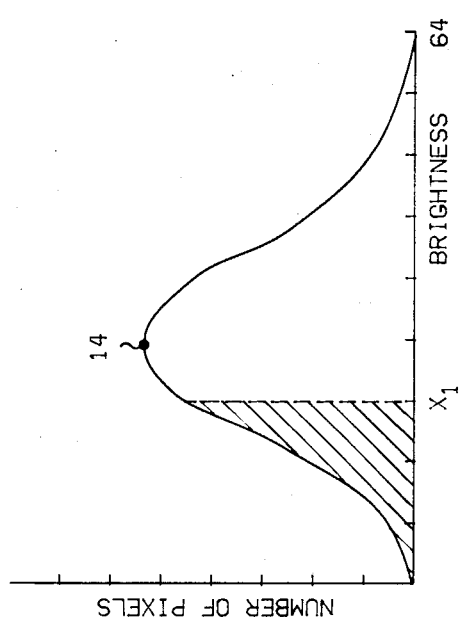
FIG. 2 is a plot of number of pixels versus brightness (a parameter related to intensity and later defined) as would typically be obtained according to the present invention.

Referring now to FIG. 2, a graph is shown wherein number of pixels is plotted versus brightness. This graph is not connected with a particular example, but is shown to illustrate what can typically be expected according to the present method. As shown, the curve plotted is generally bell shaped and generally a probability function curve. Few pixels have low brightness values, and in a similar manner, few pixels have high brightness values. The midrange brightness values are generally associated with the highest number of pixels. A point, shown at 14, is at the maximum number of pixels as compared with any other points on the curve. The brightness value associated with this point is herein called the mean brightness value. Here, the mean brightness value is conventionally defined as the total of the brightness values observed in the section divided by the total number of pixels in the section.

After the collection of the above brightness value data, this data is now processed according to the present invention as will be described below. It should be understood that the various data processing steps are typically performed by a computer according to a suitable computer program.

A cumulative probability function CPDF(x) is applied to the brightness values for each pixel to calculate new values for each pixel. The variable x represents brightness or intensity. As used herein, CPDF(x) is defined such that for a band n brightness (or intensity) value x, $$CPDF_n(x) = \frac{\text{Number of pixels having a band } n \text{ brightness less than } x}{\text{Total Number of Pixels}} \quad (2)$$

where n equals either 4 or 5. Stated another way, the value of CPDF12 (x) is the fraction of the total number of pixels having corresponding band n brightness (or intensity) values less than a particular value x, where n equals 4 or 5.

Referring again to FIG. 2, CPDF(x) can be also be understood in terms of areas under the illustrated curve. CPDF(x) can be expressed as the fraction of the total area under the curve for brightness values less than a particular x value, $x_l$. The total area is equal to the total number of pixels in the section, and the area (shown as hatched in FIG. 2) under the curve for brightness less than a brightness $x_1$ is the number of pixels having a brightness less than $x_l$.

CPDF(x) can therefore be expressed in terms of an integral by integrating to solve for the above-mentioned areas as $$\int_0^{x_1} P(x)dx, \quad (3)$$

where P(x) is the probability function for x. According to the present method, equation (2) is most conveniently employed.

By applying equation (2), the $CPDF_4(x)$ value is calculated for each pixel's corresponding band 4 brightness value. Similarly, the $CPDF_5(x)$ value is calculated for each pixel's corresponding band 5 brightness value. Thus, for each pixel, a $CPDF_4(x)$ value and a $CPDF_5(x)$ value is derived by substituting a particular brightness value into equation (2). As an illustrative example, consider a certain pixel which has a corresponding band 4 intensity value of 20. Also assume for the sake of illustration that there are 500 pixels having corresponding band 4 brightness values less than 20, and that there are 2000 total pixels. Thus, the $CPDF_4(x)$ value for this particular pixel is 500/2000, or 0.25. The $CPDF_5(x)$ value for this particular pixel is calculated in a similar manner, and $CPDF_4(x)$ and $CPDF_5(x)$ values are calculated for each other pixel in the terrain section.

Figure 3:
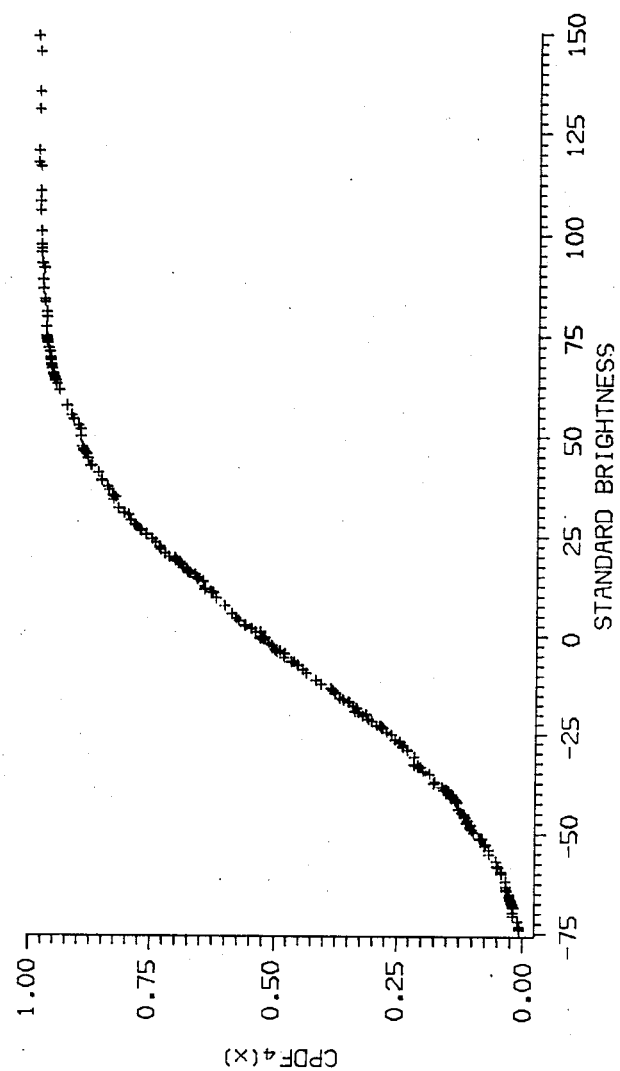
FIG. 3 is a plot of cumulative probability density function $CPDF_4(x)$ values versus brightness as obtained with the present method.
Figure 4:
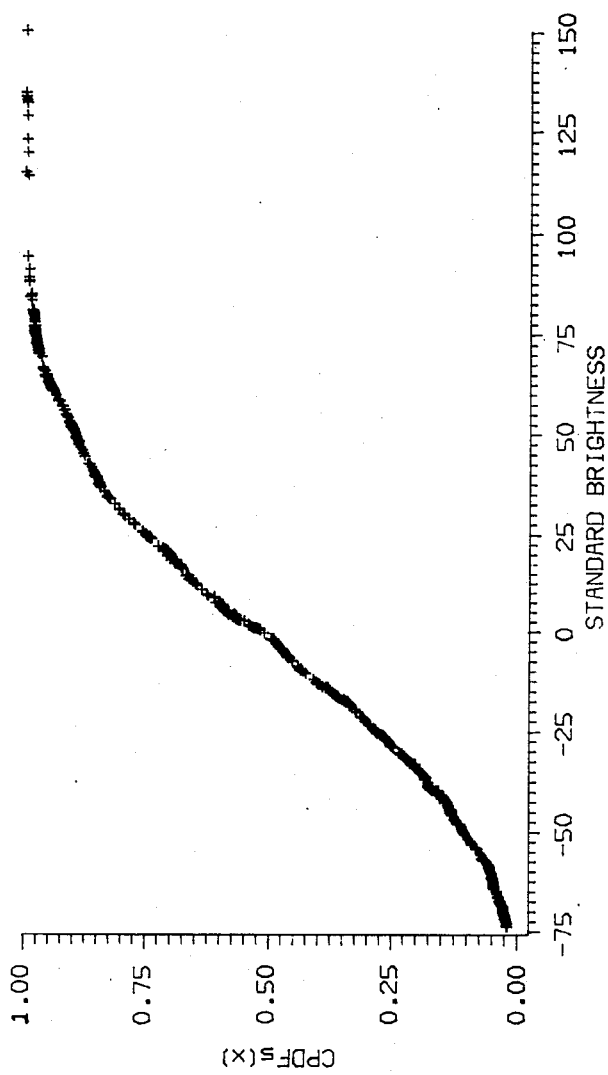
FIG. 4 is a plot of $CPDF_5(x)$ values versus brightness.

Referring now to FIGS. 3 and 4, there are shown plots of standard brightness versus $CPDF_4(x)$ and $CPDF_5(x)$ respectively for a particular example, later described. Brightness values have been standardized such that brightness 0 is set as the mean brightness value in each FIGURE. Thus, the mean brightness value has a corresponding $CPDF(x)$ value, this plotted point on each curve being the inflection point. As shown for each curve, $CPDF_4(x)$ and $CPDF_5(x)$ changes rapidly for brightness values near the mean brightness values. In addition, the slope of each curve is about 0 for very low and very high brightness values. Each individual plotted point corresponds to a band 4 or 5 brightness value for a particular pixel.

It should be understood that use of the cumulative probability function as described above is preferred but other types of functions could be employed providing they have certain characteristics. Such an alternative function should be a generally monotonic function of brightness (or intensity). As used herein and in the appended claims, a monotonic function is a function having the property of never increasing or never decreasing as the independent variable (x or brightness herein) increases. Also, there should be at least one range of brightness values for which such a function either increases or decreases as brightness increases, wherein this range includes the mean brightness value. In other words, the function should change in value around the mean brightness value.

Most preferably, the function should change in value rapidly near the mean brightness value, thus amplifying small changes in brightness for moderately bright pixels. In addition, functions employed according to the present invention should both be either increasing or decreasing functions (increases or decreases as brightness increases). Such possible alternative functions include derivative and certain exponential functions.

The cumulative probability function is preferred for several reasons. First, the cumulative probability function changes in value very rapidly in the vicinity of the mean brightness value so as to amplify small changes in brightness for moderately bright pixels. This property is highly desirable in conjunction with the present method as will be more apparent below. Second, use of the cumulative probability function tends to remove instrumental effects. This is true since the cumulative probability function is not concerned so much with how bright an image is, but rather how many pixels are of a certain brightness. Normally, light reflected from the terrain must pass through many miles of atmosphere before being received by the LANDSAT scanner. This causes many troubling signal distortions which must usually be corrected by making spectral measurements on the ground to compare to those measurements made by the LANDSAT scanner. Applying the cumulative probability function as discussed above to the LANDSAT measured brightness values removes any necessity for making such corrections to the data.

The next step in the present method involves calculation of an alteration index H value for each pixel from the calculated $CPDF_4(x)$ and $CPDF_5(x)$ values. Accordingly, for each pixel, its associated band 4 and band 5 brightness values are utilized in the equation below to yield an H value, where, $$H(x) = K[CPDF_4(x) - CPDF_5(x)], \tag{4}$$

where K is a constant. K is most preferably $11\sqrt{2}$ as will be further discussed in reference to FIG. 5. As an illustrative example, assume that for a particular pixel, the $CPDF_4(x)$ value is 0.6, and the $CPDF_5(x)$ value is 0.2. "H" rather than H(x) will be used hereafter for the sake of brevity. The H value for this pixel is then 0.4K. The H value for each pixel is calculated similarly. Thus, a set of H values is obtained, each H value corresponding a particular pixel.

Figure 5:
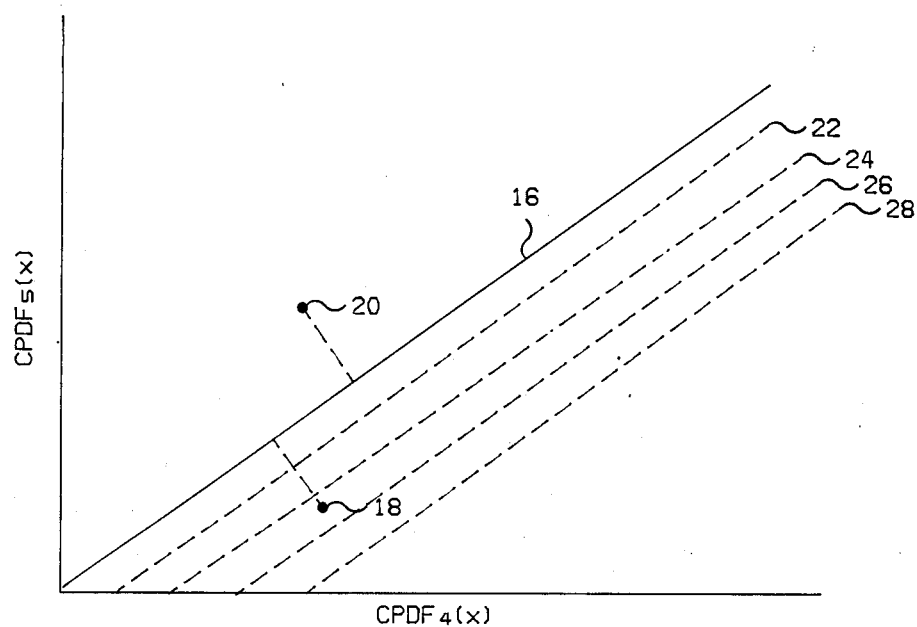
FIG. 5 is a graph wherein $CPDF_4(x)$ is plotted versus $CPDF_5(x)$.

Referring now to FIG. 5, there is shown a graph having a $CPDF_4(x)$ axis and a $CPDF_5(x)$ axis. The line indicated at 16 is drawn through points for which $CPDF_4(x) = CPDF_5(x)$, or where H=0. Plotted at 18 is shown a point for the purpose of illustration. Point 18 has as its coordinates a $CPDF_4(x)$ value and a $CPDF_5(x)$ value, wherein the $CPDF_4(x)$ value is relatively higher than the $CPDF_5(x)$ value. Thus if K is greater than 0, H is greater than 0. For point 20, H is less than 0.

According to the preferred embodiment employing cumulative probability functions, certain pixels may be selected as likely to have hydrocarbon seepage if they have H values above a predetermined value, where K is greater than 0. Referring again to FIG. 5, this selection step can be easily visualized graphically by drawing one of several boundary lines parallel to line 16 such as shown in dashed form at 22, 24, 26 and 28. A point can be plotted, only two of which are shown, for pixel having as its coordinates the pixel's corresponding $CPDF_4(x)$ and $CPDF_5(x)$ values. By making $K = 1/\sqrt{2}$, the |H| value associated with a plotted point corresponds to the perpendicular distance from line of equality 16 to that point. The absolute value of H is taken as shown since H can be negative. Assume for the sake of illustration that the perpendicular distance from line 16 to line 24 is selected as the above-mentioned predetermined value. As to point 18, the H value associated with this pair of $CPDF(x)$ values is the distance from line 16 to point 18, as noted above, and therefore greater than the predetermined H value. The pixel (or pixels) associated with this point is therefore selected as likely to have hydrocarbon seepage, and would typically be considered as an area for potential drilling. As to point 20, the H value is negative, and is definitely less than the positive predetermined H value. Generally speaking, then, pixels associated with points which lie below line 24 are selected according to the present method. Of course, any of the lines shown could be selected as a boundary wherein points below this boundary would be selected as potential drilling sites. It can also be said that the farther such a selected boundary lies from the line of equality 16, the higher the probability of finding hydrocarbons in the selected pixel areas. In other words, a higher H value is generally associated with a high probability of discovering oil or gas. Thus, if line 28 is selected as the boundary, the pixels so selected have a higher probability of having oil or gas reservoirs than pixels selected utilizing boundary 24.

If a decreasing function was used rather than $CPDF(x)$, the function would decrease as x increases. Thus, pixels would be selected if they had corresponding H values below (rather than above) the predetermined H value, if K is greater than 0.

A refinement of simply selecting a predetermined H value as discussed above involves calculation of a cumulative probability density function for H, or CPDF(H). CPDF(H) is defined such that for any value of H, $$CPDF(H) = \frac{\text{(Number of Pixels having } H \text{ values less than } H)}{\text{Total Pixels}}, \quad (5)$$

or for a particular H value, the fraction of pixels having H values less than the particular H value. Equation (5) is employed to calculate the CPDF(H) value for each pixel by substituting each pixel's H value into the expression.

Figure 6:
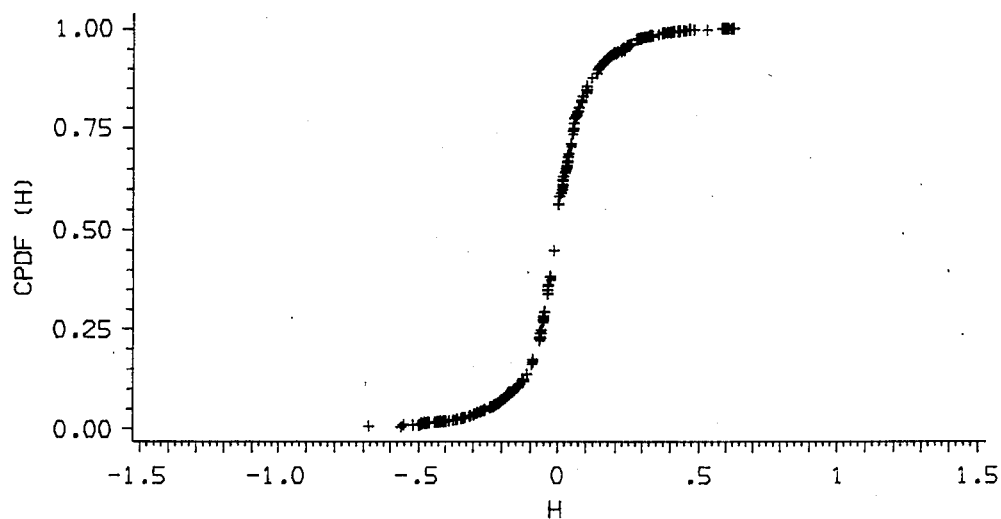
FIG. 6 is a graph showing cumulative probability density function values for H versus H.

Referring to FIG. 6, there is shown a plot of CPDF(H) versus H according to a particular example, described below. The curve shown is formed by plotting a point for each pixel wherein the point associated with a particular pixel has as its coordinates the pixel's corresponding H and CPDF(H) values.

A predetermined CPDF(H) value is selected, usually from about 0.90 to about 0.95. Pixels are then selected for potential drilling by selecting those pixels having corresponding CPDF(H) values higher than the predetermined CPDF(H) value, assuming that K is greater than 0. Therefore, pixels associated with points plotted in the uppermost portion of the curve are selected.

Figure 7:
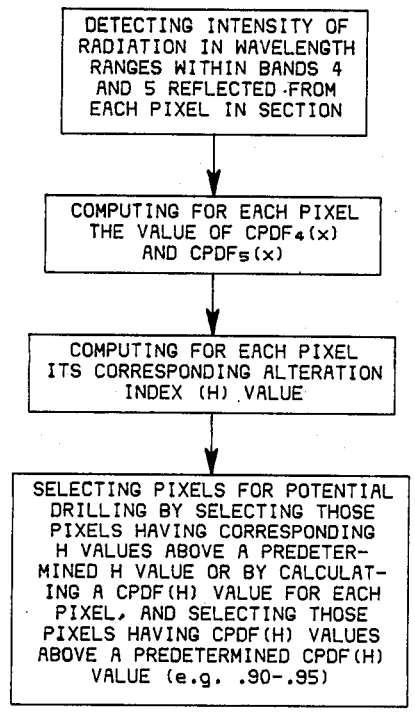
FIG. 7 is a flow chart summarizing the steps in a preferred embodiment of the present method.

Referring now to FIG. 7, there is shown a flow chart which summarizes the various steps of the preferred embodiment of the present method.

One possible explanation of the effectiveness of the above described method appears to stem from the discovery that the spectral characteristics of plants change in response to exposure to hydrocarbons. Hydrocarbons seep to the near surface from underground reservoirs and affect the roots of plants. It is thought that these hydrocarbons retard the production of certain types of chlorophyll. The result is a change in the reflectance spectrum of plant leaves in the wavelength region between about 500 nm and 700 nm. This reaction by plants has been called "stress". The difference between green (band 4) and red (band 5) light reflectance for hydrocarbon stressed plants has been found to be greater than such a difference of reflectance for nonstressed plants in the same general area. Thus, this property is employed in the present invention by utilization of the alteration index H, which is the difference between cumulative probabilities for bands 4 and 5 in the preferred embodiment.

An example will now be described which should not be construed to limit the invention in any manner. LANDSAT data was employed which was collected for a section of terrain near Coffeyville, Kans. Brightness values were obtained for about 26,750 pixels from a LANDSAT scene. The preferred embodiment of the method was applied to this data to yield $CPDF_4(x)$ and $CPDF_5(x)$ values for each pixel. Plots of these values versus brightness are shown in FIGS. 3 and 4. FIG. 6 shows a plot of CPDF(H) values, calculated from each pixel's H value, versus H. 0.90 was selected as the predetermined CPDF(H) value. Thus, pixels having CPDF(H) values above 0.90 were selected according to the invention.

Figure 8:
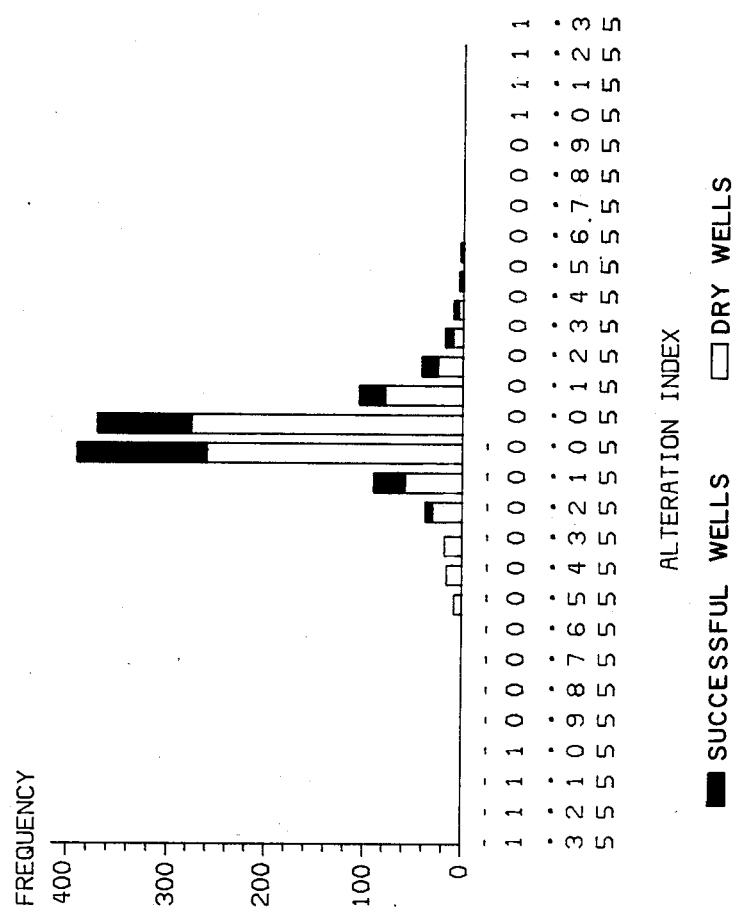
FIG. 8 is a graph wherein numbers of successful wells are compared to numbers of unsuccessful or dry wells for different values of H as obtained employing the present method.

Referring now to FIG. 8, a graph is shown wherein numbers of successful wells are compared to numbers of unsuccessful wells for certain H values. The Kansas section for which data was processed had a number of wildcat wells drilled in the past, some of which were successful, and some of which were dry.

As shown, the graph in FIG. 8 has a frequency axis and an alteration index (H) axis Here, the frequency represents the number of pixels from a square mile section, as will be explained in more detail below. Each square mile section is broken into 16 areas, each area covering 25 pixels. Average brightness values for band 4 and band 5 pixels were calculated for each area. These averages were used to compute the $CPDF_4(x)$, CPDF (x), H and CPDF(H) values as described before. A bar is graphed for each of a number of different H values, wherein the solid portion of each bar represents successful wells, and the outlined portion denotes dry wells. For the purpose of illustration, consider the bar for H=0.05. About 380 pixels had this H value. Of this total, about 280 pixels are in square mile sections containing a dry well. The remainder of pixels, or about 100, are in square mile sections containing a successful well. As can be seen for low H values of, for example, −0.35 to −0.55, virtually no pixels having such corresponding H values lie in a square mile section having a successful well. As noted above, these low H values calculated according to the present method should have relatively few corresponding pixels having hydrocarbon seepage. In contrast, for high H values of 0.45 to 0.65, the graph shows that virtually all pixels with these values lie in square mile sections having successful wells, as accurately predicted by the present method.

Referring to FIG. 9, a graph is shown which is similar to FIG. 8, but which is applicable to the above discussed prior method utilizing probability ratios. The same data for the Kansas test area was used to derive a probability ratio for each pixel according to the prior method. As already noted, the prior method identifies pixels as having hydrocarbon seepage if they have corresponding ratios above a predetermined value. It can be seen from the graph, however, that dry wells are associated with many high ratios of above 1.60, for example. Note, in particular, ratio value 3.05. As shown, about half the pixels having this high ratio are in square mile sections having dry wells. Thus, the prior method is inconsistent and somewhat inaccurate in identifying areas having oil or gas reservoirs beneath the surface. This is in contrast to the present method, which as shown in FIG. 8, more accurately predicts areas of hydrocarbon seepage by utilizing the alteration index.

Obviously many modifications and variations of the present invention are possible in light of the above teachings. It is therefore to be understood that within the scope of the appended claims the invention may be practiced otherwise than as specifically described.

What is claimed is:

1. A method of collecting and processing spectral data for a section of the earth's surface, the section being divided into a plurality of subsections hereinafter denoted as pixels, said method comprising the steps:
    (a) detecting the intensity of electromagnetic radiation in a first wavelength range reflected from each pixel such than an intensity is detected for each pixel, the first wavelength range being in a band 4 waveband of from about 500 nm to about 600 nm, the intensity as detected for each pixel in this step being denoted as a band 4 intensity value, and wherein there exists a mean band 4 intensity value;

(b) detecting the intensity of electromagnetic radiation in a second wavelength range reflected from each pixel such that an intensity is detected for each pixel, the second wavelength range being in a band 5 waveband of from about 600 nm to about 700 nm, the intensity as detected for each pixel in this step being denoted as a band 5 intensity value, and wherein there exists a mean band 5 intensity value;

(c) computing for each pixel the value of a function $F_4(x)$ corresponding to a band 4 intensity value as detected in step (a), the function $F_4(x)$ being a generally monotonic function of intensity, intensity being represented by variable x, wherein for at least one range of band 4 intensity values which includes the mean band 4 intensity value, $F_4(x)$ changes in value in a first direction as the band 4 intensity increases in value, said change in value in the first direction being either an increasing or decreasing change in value;

(d) computing for each pixel the value of a function $F_5(x)$ corresponding to a band 5 intensity value as detected in step (b), the function $F_5(x)$ being a generally monotonic function of intensity x, wherein for at least one range of band 5 intensity values which includes the mean band 5 intensity value, $F_5(x)$ changes in value in said first direction;

(e) computing for each pixel the value of an alteration index H, each pixel having corresponding $F_4(x)$ and $F_5(x)$ values as calculated in steps (c) and (d), where $$H(x) = K[F_4(x) - F_5(x)]$$

and where K is constant.

2. A method as recited in claim 1, further comprising the step of selecting certain pixels as having likely hydrocarbon seepage to the earth's surface, said selected pixels having corresponding H values above a predetermined value if each of said functions increase as intensity increases in each said intensity range, or below a predetermined value if each of said functions decrease as intensity increases in each said intensity range, assuming K is greater than 0.

3. A method as recited in claim 2, wherein $F_4(x)$ and $F_5(x)$ are cumulative probability density functions denoted as $CPDF_4(x)$ and $CPDF_5(x)$ respectively, wherein $CPDF_n$ is defined such that for a particular band n intensity value, $CPDF_n(x)$ equals the fraction of the total number of pixels having corresponding band n intensity values less than said particular band n intensity value, where n=4 or 5.

4. A method as recited in claim 1, further comprising the step of computing the value of a function CPDF(H) for each pixel, where CPDF(H) is a cumulative probability function for H which is defined such that for a particular H value, CPDF(H) is the fraction of total pixels having a corresponding H value less than said particular H value.

5. A method as recited in claim 4, further comprising the step of selecting those pixels having a corresponding CPDF(H) value above a predetermined value as having likely hydrocarbon seepage to the earth's surface, assuming K is greater than 0.

6. A method as recited in claim 5, wherein said predetermined CPDF(H) value is from about 0.90 to about 0.95.

7. A method as recited in claim 6, wherein said section contains from about 500 to about 100,000 pixels.

8. A method as recited in claim 7, wherein $K = 1/\sqrt{2}$.

* * * * *